US009397947B2

(12) United States Patent
Dunne et al.

(10) Patent No.: US 9,397,947 B2
(45) Date of Patent: Jul. 19, 2016

(54) QUALITY OF EXPERIENCE FOR COMMUNICATION SESSIONS

(71) Applicant: International Business Machines Corporation, Armonk, NY (US)

(72) Inventors: Jonathan Dunne, Dungarvan (IE); James P. Galvin, Jr., Georgetown, KY (US); Patrick J. O'Sullivan, Ballsbridge (IE); Hitham Ahmed Assem Aly Salama, Blanchardstown (IE)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 14/203,829

(22) Filed: Mar. 11, 2014

(65) Prior Publication Data
US 2015/0264104 A1  Sep. 17, 2015

(51) Int. Cl.
*H04L 29/06* (2006.01)
*H04L 29/08* (2006.01)
*H04L 12/851* (2013.01)
*H04L 12/26* (2006.01)

(52) U.S. Cl.
CPC ............... *H04L 47/24* (2013.01); *H04L 43/04* (2013.01); *H04L 65/403* (2013.01); *H04L 65/80* (2013.01); *H04L 67/2828* (2013.01)

(58) Field of Classification Search
CPC ......... H04L 43/04; H04L 47/24; H04L 65/80; H04L 67/2828; H04L 65/403
See application file for complete search history.

(56) References Cited

U.S. PATENT DOCUMENTS

| 7,002,992 B1* | 2/2006 | Shaffer ............... H04M 7/0072 370/252 |
| 7,643,414 B1* | 1/2010 | Minhazuddin ...... H04L 12/5695 370/230 |
| 8,335,232 B2 | 12/2012 | Awais |
| 8,477,614 B2 | 7/2013 | Wiley et al. |
| 2003/0086425 A1* | 5/2003 | Bearden .............. H04L 12/2697 370/392 |
| 2003/0128692 A1* | 7/2003 | Mitsumori .......... H04L 12/2602 370/352 |
| 2004/0045030 A1* | 3/2004 | Reynolds ................ H04L 29/06 725/110 |
| 2004/0114604 A1* | 6/2004 | Belgardt ............. H04L 12/5692 370/395.21 |
| 2005/0089043 A1* | 4/2005 | Seckin ................ H04L 41/5006 370/395.21 |
| 2007/0133441 A1* | 6/2007 | Kang .................... H04W 28/18 370/282 |

(Continued)

FOREIGN PATENT DOCUMENTS

WO   9905590 A2   2/1999
WO   2005120114 A1   12/2005

(Continued)

*Primary Examiner* — Joe Chacko
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and computing system is provided for managing quality of experience for communication sessions. In an implementation, a method may include analyzing network conditions relative to a plurality of codecs and a plurality of network paths. The method may also include determining a quality of experience associated with each of the plurality of codecs across each of the plurality of network paths. The method may further include transacting communication traffic using a codec-network path combination having a quality of experience above a predetermined threshold.

11 Claims, 12 Drawing Sheets

(56) References Cited

U.S. PATENT DOCUMENTS

| | | | |
|---|---|---|---|
| 2008/0155087 A1* | 6/2008 | Blouin | H04L 43/0817 709/223 |
| 2010/0161325 A1* | 6/2010 | Hellwig | H04L 5/1438 704/229 |
| 2011/0069625 A1* | 3/2011 | Michaelis | H04L 47/10 370/252 |
| 2011/0225247 A1* | 9/2011 | Anantharaman | H04M 3/568 709/206 |
| 2013/0156119 A1* | 6/2013 | Poulin | H04L 65/80 375/259 |
| 2013/0230057 A1 | 9/2013 | Hori et al. | |
| 2014/0219088 A1* | 8/2014 | Oyman | H04N 21/23439 370/231 |

FOREIGN PATENT DOCUMENTS

| | | |
|---|---|---|
| WO | 2009032366 A2 | 3/2009 |
| WO | 2011130602 A1 | 10/2011 |

\* cited by examiner (a) Path 1:

| Network Stats /Available Codec | Random Packet loss | One way delay | Burst Ratio | MOS |
|---|---|---|---|---|
| Codec 1 | 8% | 40 | 1.5 | 2.8 |
| Codec 2 | 5% | 30 | 1.2 | 3.0 |
| Codec 3 | 1% | 70 | 1.0 | 3.6 |

(b) Path 2:

| Network Stats /Available Codec | Random Packet loss | One way delay | Burst Ratio | MOS |
|---|---|---|---|---|
| Codec 1 | 7% | 200 | 1.2 | 2.1 |
| Codec 2 | 5% | 170 | 1.1 | 3.1 |
| Codec 3 | 2% | 50 | 1.0 | 4.3 |

(c) Path 3:

| Network Stats /Available Codec | Random Packet loss | One way delay | Burst Ratio | MOS |
|---|---|---|---|---|
| Codec 1 | 2% | 500 | 1.3 | 2.4 |
| Codec 2 | 3% | 100 | 1.2 | 3.2 |
| Codec 3 | 4% | 60 | 1.0 | 3.8 |

FIG. 8

QUALITY OF EXPERIENCE FOR COMMUNICATION SESSIONS

TECHNICAL FIELD

The present disclosure generally relates to systems and method for electronic communications, and more particularly relates to managing quality of experience for electronic communication sessions.

BACKGROUND

Various collaboration systems exist for enabling individuals to engage in collaborate activities, such as working together on projects, sharing information, and the like. Collaboration systems can be particularly useful in allowing geographically dispersed individuals to interact and work with one another. Using various different collaboration systems, or multi-functional collaboration systems, individuals who are geographically remote from one another may, for example, engage in common work projects, for example, using online team work spaces, participate in interactive discussions, for example, using teleconferencing or video conferencing systems, and engage in meetings, for example, using electronic meeting systems that allow for presentations, lectures, seminars, and the like.

SUMMARY OF DISCLOSURE

According to an implementation, a computer-implemented method may include analyzing, by a processor, network conditions relative to a plurality of codecs and a plurality of network paths. The method may also include determining a quality of experience associated with each of the plurality of codecs across each of the plurality of network paths. The process may further include transacting communication traffic using a codec-network path combination having a quality of experience above a predetermined threshold.

One or more of the following features may be included. Analyzing network conditions may include transmitting emulated communication traffic for each of the plurality of codecs across each of the plurality of network paths. Performance characteristics may be received associated with each of the plurality of codecs for each of the plurality of network paths.

Determining the quality of experience may include analyzing performance characteristics associated with each of the plurality of codecs across each of the plurality of network paths. A quality of experience score may be determined for each of the plurality of codecs across each of the plurality of network paths. Determining the quality of experience may include identifying one of the plurality of codecs associated with a quality of experience score above a threshold as a selected codec. Determining the quality of experience may also include identifying one of the plurality of network paths associated with a quality of experience score above the threshold as a selected network path. A codec-network path combination may be determined having a quality of experience above a predetermined threshold based upon, at least in part, the selected codec and the selected network path.

Transacting communication traffic may include transmitting an indication of a selected codec to be utilized for transmitted communication traffic to a sending participant of a communication session. Communication traffic may be received from the sending participant, the communication traffic encoded according to the selected codec. Transacting communication traffic may also include transmitting the communication traffic from the sending participant to a receiving participant via a selected network path.

The method may further include dynamically determining a changed codec-network path combination based upon, at least in part, a determined change in quality of experience associated with one or more of the plurality of codecs and the plurality of network paths. Communication traffic may be transacted using the changed codec-network path combination.

According to another implementation, a computer program product includes a computer readable storage medium having a plurality of instructions stored on it. When executed by a processor, the instructions may cause the processor to perform operations including analyzing network conditions relative to a plurality of codecs and a plurality of network paths. Instructions may also be included for determining a quality of experience associated with each of the plurality of codecs across each of the plurality of network paths. The computer program product may further include instructions for transacting communication traffic using a codec-network path combination having a quality of experience above a predetermined threshold.

One or more of the following features may be included. The instructions for analyzing network conditions may include instructions for transmitting emulated communication traffic for each of the plurality of codecs across each of the plurality of network paths. Performance characteristics may be received associated with each of the plurality of codecs for each of the plurality of network paths.

The instructions for determining the quality of experience may include instructions for analyzing performance characteristics associated with each of the plurality of codecs across each of the plurality of network paths. A quality of experience score may be determined for each of the plurality of codecs across each of the plurality of network paths. The instructions for determining the quality of experience may include instructions for identifying one of the plurality of codecs associated with a quality of experience score above a threshold as a selected codec. One of the plurality of network paths associated with a quality of experience score above the threshold may be identified as a selected network path. A codec-network path combination may be determined having a quality of experience above a predetermined threshold based upon, at least in part, the selected codec and the selected network path.

The instructions for transacting communication traffic may include instructions for transmitting an indication of a selected codec to be utilized for transmitted communication traffic to a sending participant of a communication session. Communication traffic may be received from the sending participant, the communication traffic encoded according to the selected codec. The communication traffic from the sending participant may be transmitted to a receiving participant via a selected network path.

Instructions may also be included for dynamically determining a changed codec-network path combination based upon, at least in part, a determined change in quality of experience associated with one or more of the plurality of codecs and the plurality of network paths. Communication traffic may be transacted using the changed codec-network path combination.

According to yet another implementation, a computing system includes a processor and a memory module coupled with the processor. The processor may be configured for analyzing network conditions relative to a plurality of codecs and a plurality of network paths. The processor may also be configured for determining a quality of experience associated with each of the plurality of codecs across each of the plurality of network paths. The processor may further be configured for transacting communication traffic using a codec-network path combination having a quality of experience above a predetermined threshold.

One or more of the following features may be included. Analyzing network conditions may includes transmitting emulated communication traffic for each of the plurality of codecs across each of the plurality of network paths. Performance characteristics may be received associated with each of the plurality of codecs for each of the plurality of network paths.

Determining the quality of experience may include analyzing performance characteristics associated with each of the plurality of codecs across each of the plurality of network paths. A quality of experience score may be determined for each of the plurality of codecs across each of the plurality of network paths. Determining the quality of experience may include identifying one of the plurality of codecs associated with a quality of experience score above a threshold as a selected codec. One of the plurality of network paths associated with a quality of experience score above the threshold may be identified as a selected network path. A codec-network path combination having a quality of experience above a predetermined threshold may be determined based upon, at least in part, the selected codec and the selected network path.

Transacting communication traffic may include transmitting an indication of a selected codec to be utilized for transmitted communication traffic to a sending participant of a communication session. Communication traffic may be received from the sending participant, the communication traffic encoded according to the selected codec. The communication traffic from the sending participant may be transmitted to a receiving participant via a selected network path.

The processor may be further configured for dynamically determining a changed codec-network path combination based upon, at least in part, a determined change in quality of experience associated with one or more of the plurality of codecs and the plurality of network paths. Communication traffic may be transacted using the changed codec-network path combination.

The details of one or more implementations are set forth in the accompanying drawings and the description below. Other features and advantages will become apparent from the description, the drawings, and the claims.

BRIEF DESCRIPTION OF THE DRAWINGS

FIG. 8 diagrammatically depicts an implementation of the quality of experience process of FIG. 1, according to an example embodiment;

Like reference symbols in the various drawings indicate like elements.

DETAILED DESCRIPTION

Figure 1:
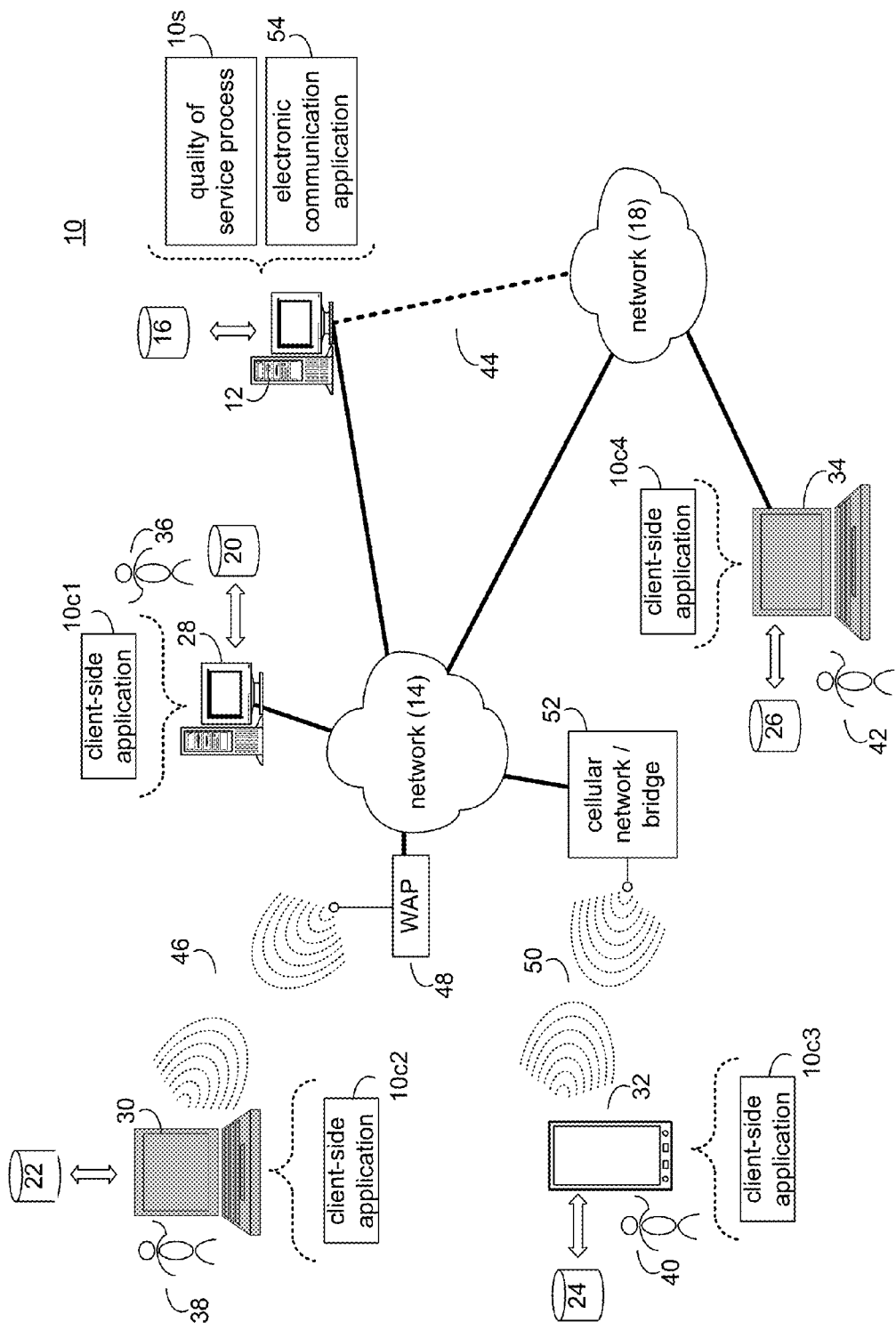
FIG. 1 is a diagrammatic view of a distributed computing network including a computing device that executes a quality of experience process according to an implementation of the present disclosure.

Individuals may often engage in communication sessions, utilizing a data network for conveying the communications. Such communication sessions may include, for example, Voice-over-IP and Video-over-IP communications, in which the communications to and from each party may be conveyed as packetized data over a data network. The quality of these types of communications can be greatly effected by network conditions. For example, delay, packet loss, jitter, burst ratio may be important factors that may impact the perceived quality of experience of the individuals participating in a communication session. For example, as packet loss increases the quality of the communication may be degraded, for example with the individuals experiencing broken or garbled audio signals, increased interference and noise, and the like. Changes in other network characteristics may similarly impact, either positively or negatively, the quality of experience perceived by the participants in a communication session.

Consistent with some embodiments, the present disclosure may provide a hybrid technique for adaptively selecting a communication codec and a network path combination for providing a comparatively high quality of experience for the participants of a communication session. For example, multiple different codecs may be available for conducting a communication session, and multiple different network pathways may be available for transmitting the communication data between the participants of the communication session. Different codecs may be used to digitize and packetize communication from transmission between the participants of a communication session, and subsequent conversion of the packetized and digitized data to analog voice signal that may be consumed by participants of the communication session. Different codecs may vary in bandwidth requirements, latency, sample period, frame size, and maximum achieved end user perceived quality. As such, different codecs may be better to suite to different network conditions. Further, different network paths between participants of the communication session may present different network characteristics, such as available bandwidth, packet loss rates, end-to-end delay, jitter, burst ratio, etc. In an embodiment, the present disclosure may identify network characteristics associated with each available network path between the participants of the communication session. A quality of experience that would be achieved by the various different available codecs for the network characteristics of each available network path may be determined. A combination of codec and network path may be selected for conducting the communication session that may provide an improved call quality perceived by the end users, e.g., as compared to at least another codec-path combination. In some embodiments, the codec-path combination may be adaptively determined throughout the communication session, and new codec-path combinations may be selected as network conditions experience by one or more of the available network paths vary over time.

In an embodiment, network conditions experienced by different network paths between participants of a communication session may be determined. For example, in some embodiments, a communication gateway associated with one participant of the communication session may transmit emulated communication traffic to a communication gateway associated with another participant of the communication session. Based upon, at least in part, the transmitted emulated traffic, network characteristics for each of the available network paths between the participants of the communication session may be determined. An anticipated performance of each available codec across each network path (given the determined network conditions associate with each available network path) may be determined. Based on the determined anticipated performance of each available codec across each network path, a codec-path combination may be selected. In an embodiment, an indication of the selected codec may be transmitted to a participant of the communication session for digitizing and packetizing communication data. Further, the communication data digitized and packetized according to the selected codec may be transmitted to another participant of the communication session using the selected network path.

Intermittently and/or continuously throughout the communication session, the network characteristics associated with the available network paths may be determined. Similarly, the anticipated performance of each available codec across each available network path (given the determined network characteristics associated with each network path) may also be determined. A changed selected codec-path combination may be selected in response to changed anticipated performance of the different codec-path combinations. The changed selected codec-path combination may be implemented for conducting the communication session.

Referring to FIG. 1, there is shown quality of experience process 10. For the following discussion, it is intended to be understood that quality of experience process 10 may be implemented in a variety of ways. For example, quality of experience process 10 may be implemented as a server-side process, a client-side process, or a server-side/client-side process.

For example, quality of experience process 10 may be implemented as a purely server-side process via quality of experience process 10s. Alternatively, quality of experience process 10 may be implemented as a purely client-side process via one or more of client-side application 10c1, client-side application 10c2, client-side application 10c3, and client-side application 10c4. Alternatively still, quality of experience process 10 may be implemented as a server-side/client-side process via server-side quality of experience process 10s in combination with one or more of client-side application 10c1, client-side application 10c2, client-side application 10c3, and client-side application 10c4. In such an example, at least a portion of the functionality of quality of experience process 10 may be performed by quality of experience process 10s and at least a portion of the functionality of quality of experience process 10 may be performed by one or more of client-side application 10c1, 10c2, 10c3, and 10c3.

Accordingly, quality of experience process 10 as used in this disclosure may include any combination of quality of experience process 10s, client-side application 10c1, client-side application 10c2, client-side application 10c3, and client-side application 10c4.

Figure 2:
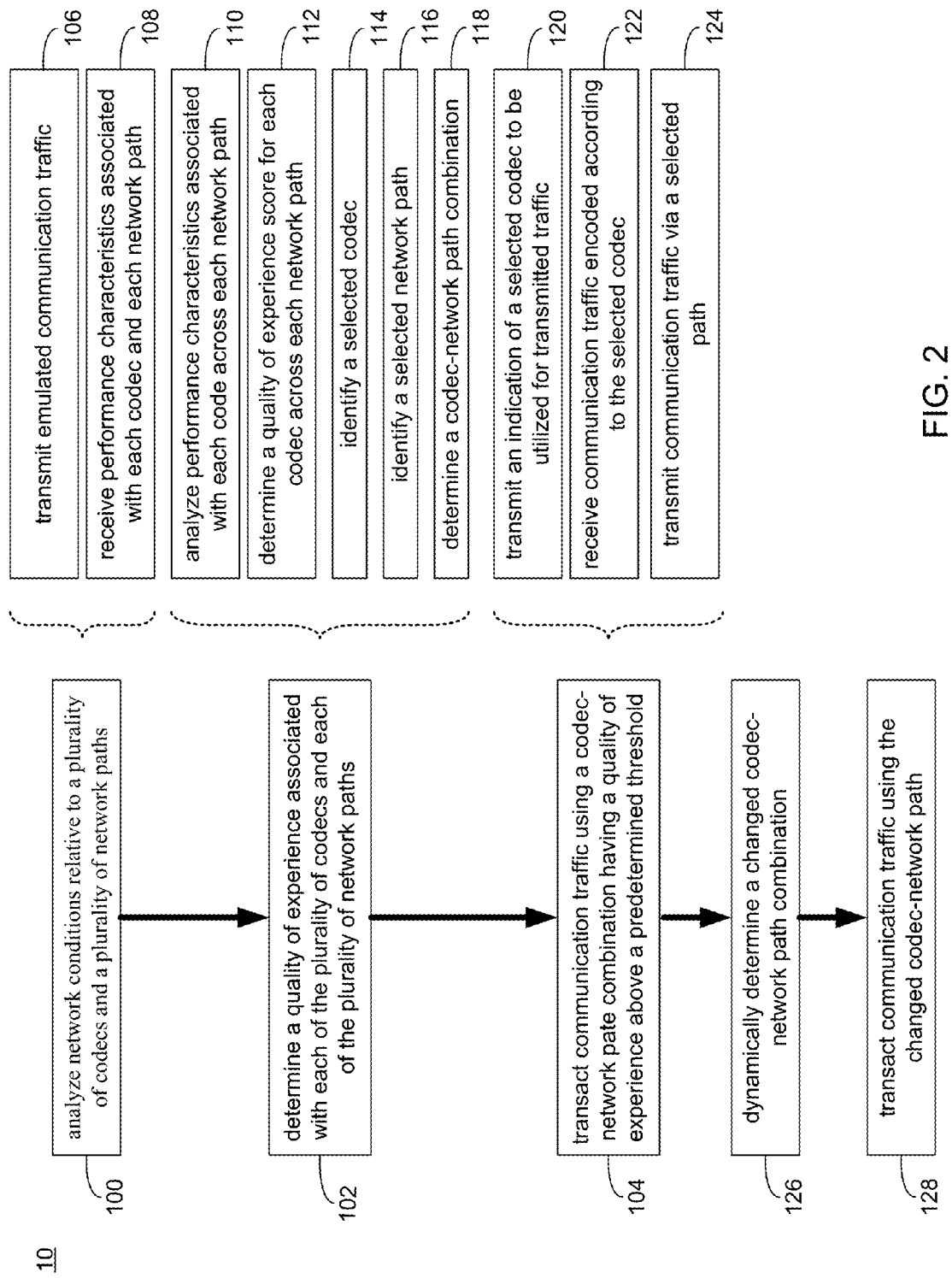
FIG. 2 is a flowchart of the quality of experience process of FIG. 1, according to an implementation of the present disclosure.

Referring also to FIG. 2, and as will be discussed in greater detail below, quality of experience process 10 may analyze 100 network conditions relative to a plurality of codecs and a plurality of network paths. Quality of experience process 10 may also determine 102 a quality of experience associated with each of the plurality of codecs across each of the plurality of network paths. Quality of experience process 10 may further transact 104 communication traffic using a codec-network path combination having a quality of experience above a predetermined threshold.

Quality of experience process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of quality of experience process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of a voice-over-IP application, a video-over-IP application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access quality of experience process 10 directly through network 14 or through secondary network 18. Further, quality of experience process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, quality of experience process 10 may communicate with, interact with, and/or include a component or module of a communication application (e.g., communication application 54). As is generally known, a communication application (e.g., communication application 54) may generally facilitate audio and/or video communications between individuals as participants in a communication session. For example, communication application 54 may facilitate voice over IP and/or video over IP communications between communication session participants. In some embodiments, a communication session may only include two participants. In some embodiments, a communication session may include more than two participants. In some embodiments, communication application 54 may include, and/or may interact with, for example, an electronic meeting application, a web conferencing application, or a similar application. An example of communication application 54 may include, but is not limited to, Lotus® Sametime®. (Lotus and Sametime are registered trademarks of International Business Machine Corporation in the United States, other countries, or both). In some embodiments, communication application 54 may include a communication gateway and/or provide functionality of a communication gateway.

In an embodiment, the instruction sets and subroutines of electronic communication application 54 may be stored, e.g., on storage device 16 associated with server computer 12, which executes electronic communication application 54, and/or another suitable storage device. Further, users (e.g., one or more of users 36, 38, 40, 42) may access electronic communication application 54 in order to participate in an electronic communication session (such as a voice call, a video call, an electronic meeting, or other communication session type). The users may access electronic communication application 54 via one or more suitable applications, such as client side applications 10c1-10c4 (e.g., which may include a voice-over-IP application, a video-over-IP application, a web browser, a client electronic meeting application, or another application) and/or via a different application (not shown). Additionally, while some users are depicted as being connected with server computer 12 (and therefore with electronic communication application 54) via network 14, which may include the Internet, in other embodiments, one or more users may be directed connected to server computer 12 and/or connected with server computer 12 via, e.g., a local area network and/or similar connection.

As generally discussed above, a portion and/or all of the functionality of quality of experience process 10 may be provided by one or more of client side applications 10c1-10c4. For example, in some embodiments quality of experience process 10 (and/or client-side functionality of quality of experience process 10) may be included within and/or interactive with client-side applications 10c1-10c4, which may include client side electronic communication applications, web browsers, or another application. Various additional/alternative configurations may be equally utilized.

As generally discussed above with reference to FIG. 2, quality of experience process 10 may analyze 100 network conditions relative to a plurality of codecs and a plurality of network paths. Quality of experience process 10 may also determine 102 a quality of experience associated with each of the plurality of codecs across each of the plurality of network paths. Quality of experience process 10 may further transact 104 communication traffic using a codec-network path combination having a quality of experience above a predetermined threshold.

Figure 3:
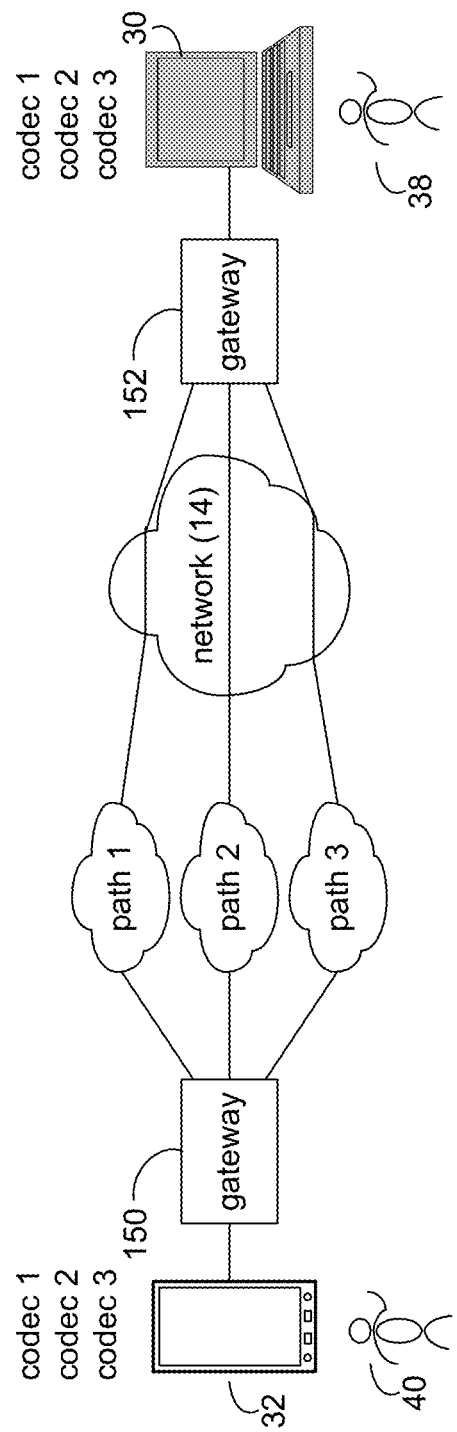
FIG. 3 diagrammatically depicts an implementation of the quality of experience process of FIG. 1, according to an example embodiment.

For example, and referring also to FIG. 3, users of an electronic communication system (e.g., user 40 and user 38), such as a VoIP system, or another electronic communication system as generally discussed above, may participate in a communication session via respective client electronic devices 30 and 32. As shown, client electronic devices 30, 32, via which user 38 and user 40 may participate in the communication session, may be coupled to network 14 (e.g., which may include the internet or other data network) by way of gateways 150, 152. Gateways 150, 152 may generally facilitate the communication session, e.g., by connecting to network 14 and routing communication data (e.g., packet streams, or the like) between participants, user 30 and user 32, of the communication session. As discussed above, gateways 150, 152 may include functionality of an electronic communication application (such as electronic communication application 54) and may reside on and/or by hosted by server computer 12, and/or another suitable computing device. While client electronic devices 30 and 32 have been shown directly coupled to gateways 150, 152 it will be appreciated that client electronic devices 30, 32 may be coupled to gateways 150, 152 via computing networks, such as local area networks, wide area networks, and/or other data networks.

In some situations, as shown in FIG. 3, one or more of the participants (e.g., user 40) may be capable of connecting to the internet via one or more network paths. For example, as shown, client electronic device 32 may be coupled to gateway 150 (e.g., directly and/or through one or more data networks). Further, gateway 150 may be capable of connecting to network, 14 (e.g., which may include the Internet) via one or more network paths (e.g. path 1, path 2, path 3). The different network paths through which gateway 150 may connect to network 14 may include, for example, different available internet service providers (ISP's), or other network paths through which gateway 150 may be capable of connecting to network 14. Additionally, while gateway 152 is depicted as being connected to network 14 via a single network path, this is intended for simplicity of descriptions. Gateway 152 may be capable of connecting to network 14 via a plurality of different network paths in a manner generally similar to gateway 150. Additionally, while three network paths will be described, it will be appreciated that a greater or fewer number of network paths may be available for gateway 150 to connect to network 14.

Additionally, each of the participants of the communication session may be capable of utilizing a plurality of different codecs for encoding and transmitting the communication streams. As shown in the illustrated example of FIG. 3, each of client electronic device 30 and 32 may be capable of utilized any of codec 1, codec 2, and codec 3. It will be appreciated that a greater or fewer number of codecs may be available for conducting the communication session between user 38 and user 40. Examples of codecs that may be utilized in connection with a VoIP communication session may include, but are not limited to, G711, ILBC, SILK, SPEEX. Various additional and/or alternative codecs may be utilized.

Figure 4:
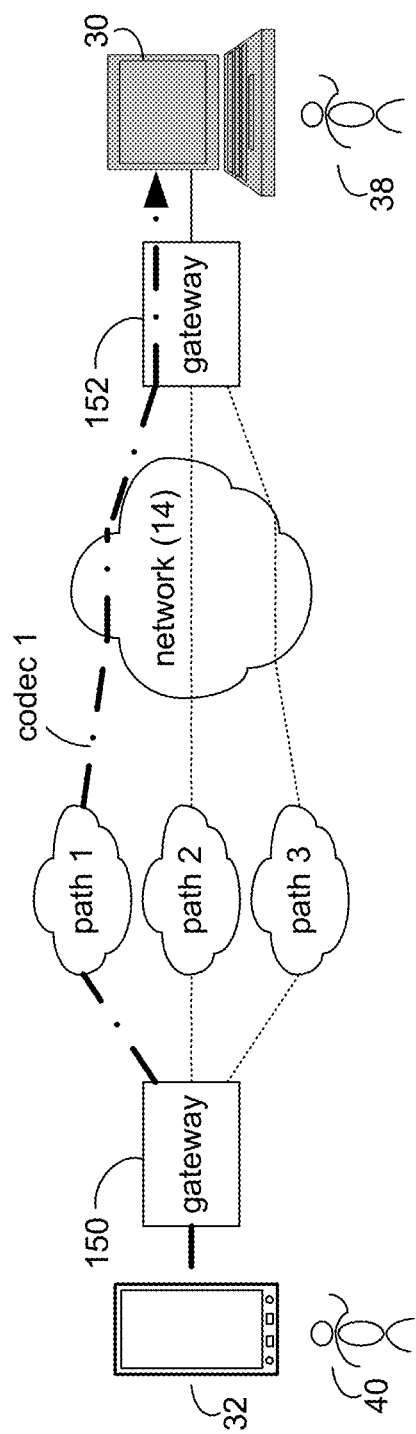
FIG. 4 diagrammatically depicts an implementation of the quality of experience process of FIG. 1, according to an example embodiment.

Referring also to FIG. 4, when the communication session is initially started between user 38 and user 40 one of the available codecs and one of the available network paths may be selected. In the illustrated example, codec 1 and network path 1 may be initially selected for beginning the communication session. The initially selected codec and network path may be selected based upon, for example, a default setting, initially determined network conditions, or the like.

Figure 5:
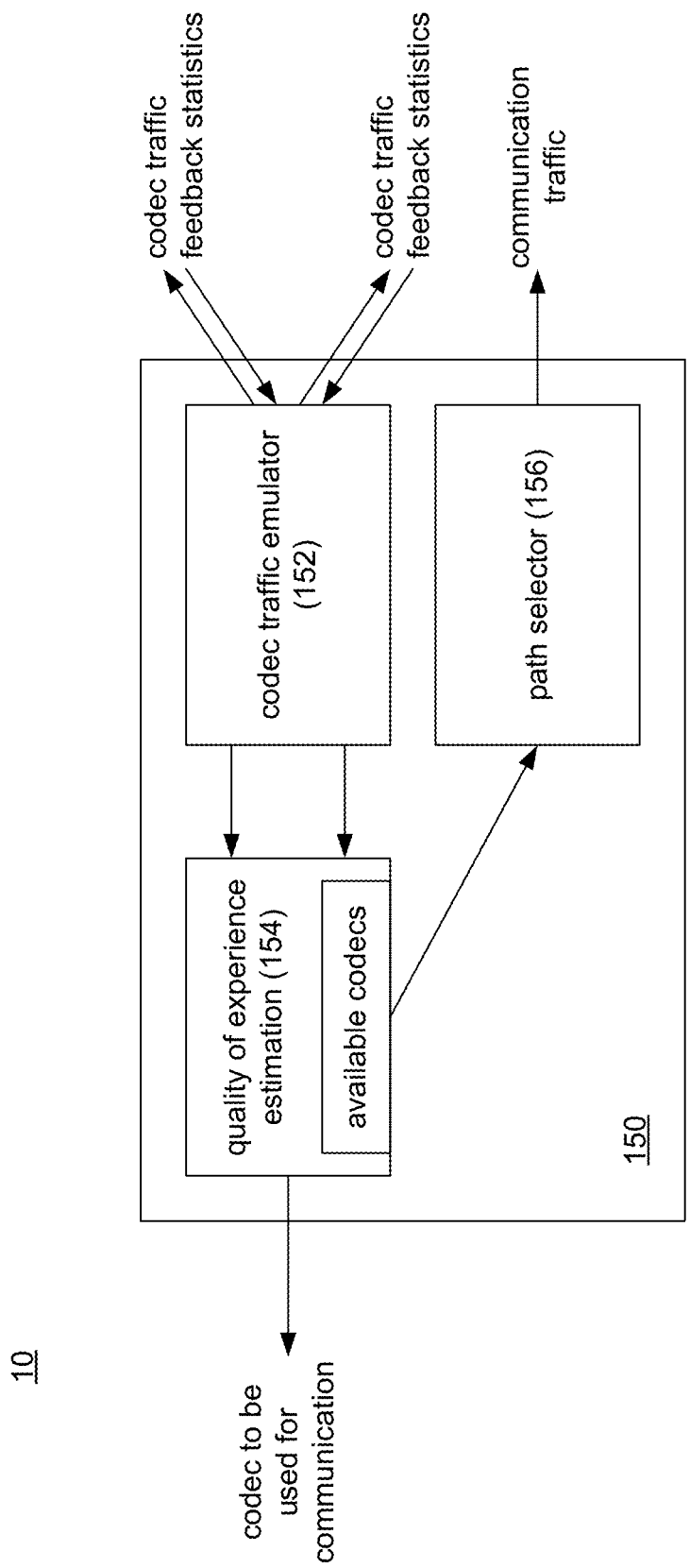
FIG. 5 diagrammatically depicts an implementation of the quality of experience process of FIG. 1 via a voice-over-IP gateway, according to an example embodiment.
Figure 6:
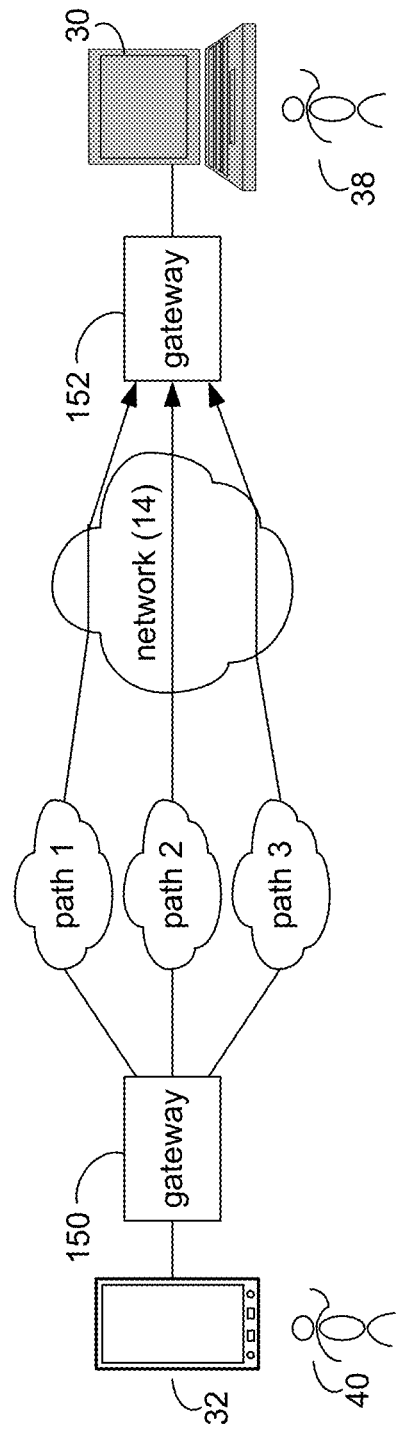
FIG. 6 diagrammatically depicts an implementation of the quality of experience process of FIG. 1, according to an example embodiment.

As generally described above, quality of experience process 10 may analyze 100 network conditions relative to a plurality of codecs and a plurality of network paths. For example, quality of experience process 10 may determine network conditions across each of the available network paths (e.g., network path 1, network path 2, and network path 3 in the illustrated example). Each of the available network paths may include a network path through which a gateway (e.g., gateway 150) may connect to network 14, via which communication traffic may be transported between user 40 (via client electronic device 32) and user 38 (via client electronic device 30). In some situations, each available network path may include a different ISP through which gateway 150 may be capable of connecting to the Internet. It will be appreciated that, while not shown, gateway 152 may similarly be capable of connecting to network 14 via a plurality of different network paths. Accordingly, quality of experience process 10 may analyze 100 network conditions relative to the plurality of codecs and the plurality of network paths to determine how well communication traffic encoded according to each of the available codecs may be expected to perform (i.e., to determine the perceived end user experience) for each of the available network paths Analyzing 100 network conditions may include transmitting 106 emulated communication traffic for each of the plurality of codecs across each of the plurality of network paths. For example, and referring also to FIG. 5 a functional block diagram of gateway 150 is shown. Gateway 150 may include, communicate with, and/or implement at least a portion of quality of experience process 10. In the illustrated example embodiment, gateway 150 may include codec traffic emulator 152. Referring also to FIG. 5, codec traffic emulator 152 may transmit 106 emulated communications traffic across each of the available network paths (e.g., network path 1, path 2, and path 3). In an embodiment, the emulated traffic may include characteristic patterns of each codec (e.g., each of codec 1, codec 2, codec 3, in the illustrated example).

Figure 7:
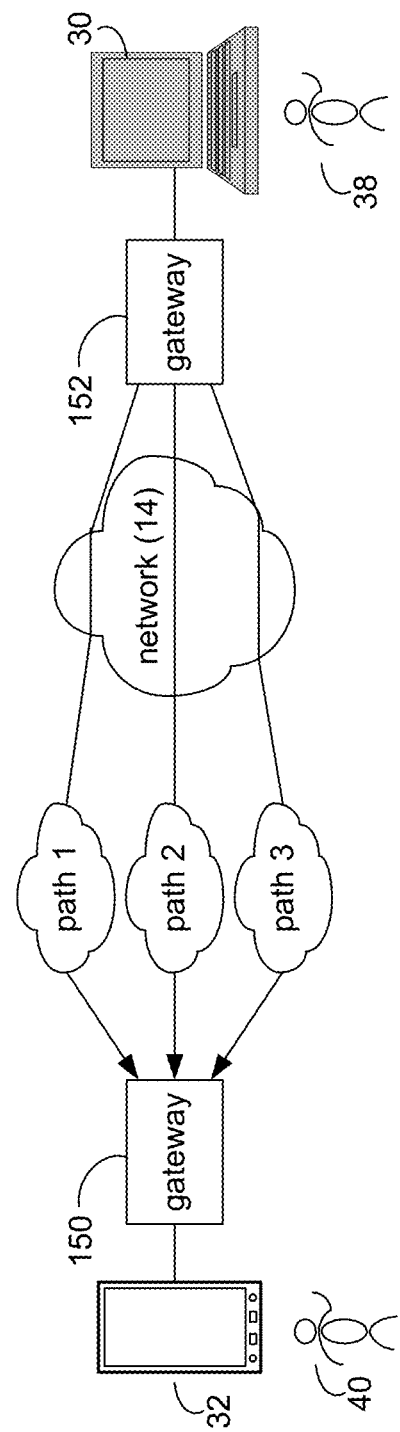
FIG. 7 diagrammatically depicts an implementation of the quality of experience process of FIG. 1, according to an example embodiment.

Referring also to FIG. 7, quality of experience process 10 may receive 108 performance characteristics associated with each of the plurality of codecs for each of the plurality of network paths. For example, the emulated communication traffic transmitted 108 over each available network path may be received by a gateway associated with another participant of the communication session (e.g., gateway 152 associated with user 38). Gateway 152 may transmit determined network characteristics back to gateway 150, which may receive 108 the performance characteristics associated with each of the plurality of codecs for each of the plurality of network paths. Examples of performance characteristics for each of the plurality of codecs for each of the plurality of network paths may include, for example packet loss, burst ratio, overall delay, etc., experiences by emulated traffic for each available codec and each available network path.

Quality of experience process 10 may also determine 102 a quality of experience associated with each of the plurality of codecs across each of the plurality of network paths. For example, quality of experience process 10 may analyze the performance characteristics received 108 from the emulated traffic to determine which coded-path combination may provide desirable perceived quality of experience for the communication. For example, and referring also to FIG. 8, determining 102 the quality of experience may include analyzing 110 performance characteristics associated with each of the plurality of codecs across each of the plurality of network paths. As shown in FIG. 8 performance metrics may be determined for the emulated traffic having a pattern consistent with each available codec for each available network path. The received performance characteristics may be analyzed to determined an anticipated performance (e.g., in terms of perceived call quality) of each codec on each network path.

In an embodiment quality of experience process 10 may determine 112 a quality of experience score for each of the plurality of codecs across each of the plurality of network paths. In an embodiment, quality of experience estimation 154 of gateway 150 may determine 112 the quality of experience score for each of the plurality of codecs across each of the plurality of network paths. With continued reference to FIG. 8, in an embodiment the quality of experience metric may include a Mean Opinion Score ("MOS") for each codec across each network path. The quality of experience score may be determined 112 based upon, at least in part, the available bandwidth of the network path and the bandwidth dependency of the codec, the average packet loss rate of the network path and the acceptable packet loss rate of the codec, the delay of the network path and the delay dependency of the codec, etc. As shown in FIG. 8, an MOS score may be determined 112 for each of the available codecs across each of the available network paths based upon, at least in part, the performance characteristics associated with each network path and the requirements of each codec.

In an embodiment, determining 102 the quality of experience may include identifying 114 one of the plurality of codecs associated with a quality of experience score above a threshold as a selected codec. Additionally, determining 102 the quality of experience may also include identifying 116 one of the plurality of network paths associated with a quality of experience score above the threshold as a selected network path. In an embodiment, the threshold may include a predetermined threshold. In another embodiment, the threshold may include a relative threshold, e.g., based upon, at least in part, the determined quality of experience scores. In an embodiment, the threshold may include a quality of experience score equal to a given number or percentage of the determined 112 quality of experience scores. As such, a codec and/or a network path having a quality of experience score higher than one or more of the other codecs and/or network paths may be identified 114, 116 as a selected codec and/or selected network path. In one example embodiment, the codec having a quality of experience score above the threshold may include the codec exhibiting the highest quality of experience score. Similarly, in one example embodiment, the network path having a quality of experience score above the threshold may include the network path having the highest quality of experience score.

With continued reference to FIG. 8, codec 3 on network path 2 may exhibit the highest quality of experience score (e.g., having an MOS of 4.3). In such an embodiment, codec 3 may be identified 114 as the selected codec and network path 2 may be identified 116 as the selected network path. Consistent with the foregoing, quality of experience process may determine 118 codec 3-network path 2 as a codec-network path combination having a quality of experience above a predetermined threshold based upon, at least in part, the selected codec and the selected network path. That is, for example, the codec 3-network path 2 combination may be expected to provide the highest perceived quality of experience for the participants of the communication session.

Quality of experience process 10 may further transact 104 communication traffic using a codec-network path combination having a quality of experience above a predetermined threshold. The communication traffic may include, for example, the packetized data associated with the communication session, e.g., which may provide an audio and/or video stream and/or other communication traffic (e.g., associated text data, exchanged files, etc.). In an embodiment, transacting 104 the communication traffic using the codec-network path combination having a quality of experience above a predetermined threshold may provide a communication session having a highest perceived quality of experience. Accordingly, quality of experience process 10 may adaptively selected both a codec and a network path for transmitting and receiving communication traffic.

Figure 9:
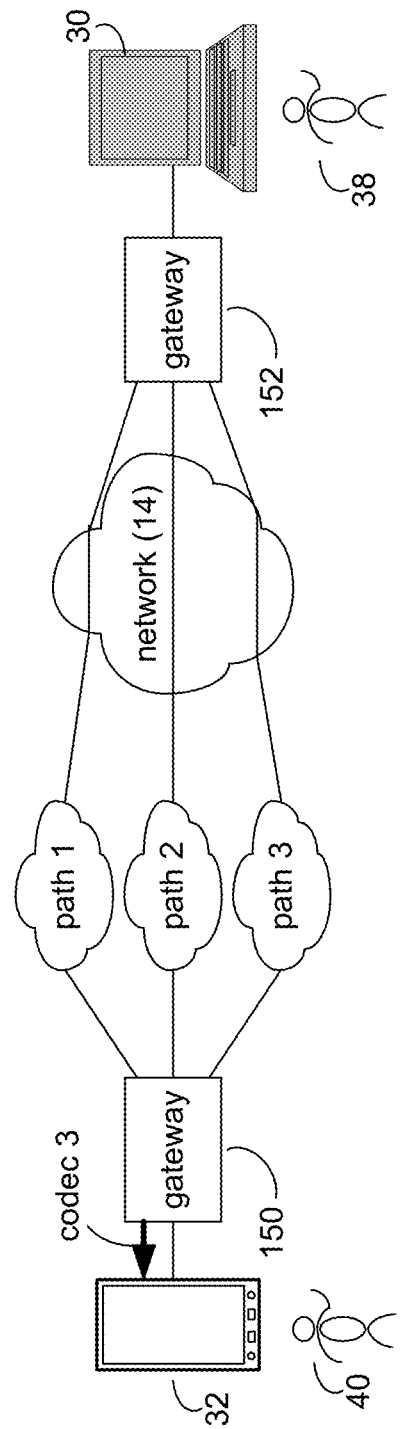
FIG. 9 diagrammatically depicts an implementation of the quality of experience process of FIG. 1 via a voice-over-IP gateway, according to an example embodiment.

Transacting 104 communication traffic may include transmitting 120 an indication of a selected codec to be utilized for transmitted communication traffic to a sending participant of a communication session. For example, and referring also to FIG. 9, quality of experience estimation 154 of gateway 150 may transmit 120 an indication of the selected codec to user 40 as a sending participant. Based upon, at least in part, the transmitted 120 indication of the selected codec, client electronic device 32 may encode communication traffic using codec 3. Accordingly, quality of experience process 10 (e.g., which may be implemented as and/or by gateway 150, may receive 122 communication traffic from the sending participant (e.g., client electronic device 32), in which the communication traffic may be encoded according to the selected codec (e.g., may be encoded using codec 3).

Figure 10:
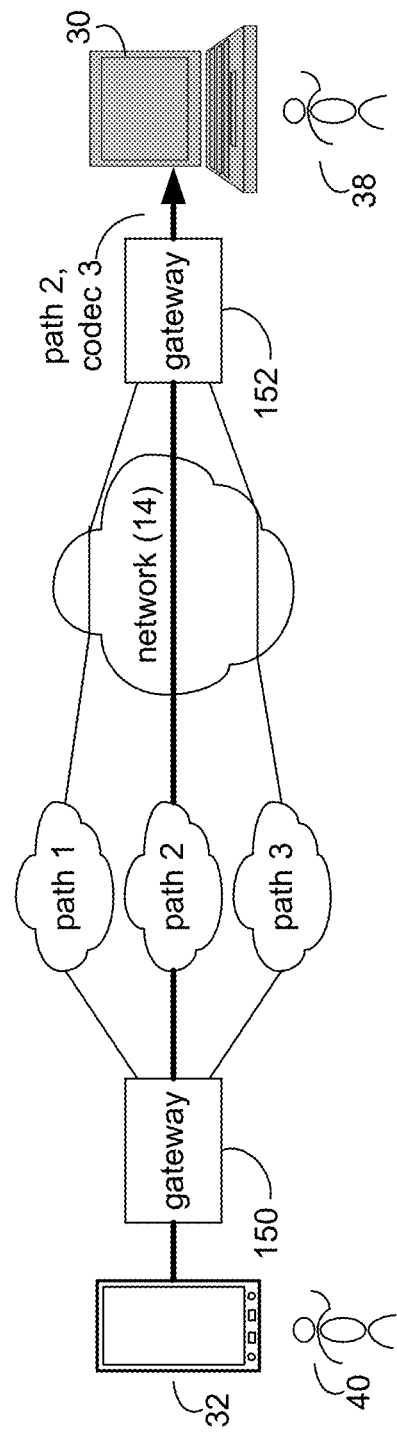
FIG. 10 diagrammatically depicts an implementation of the quality of experience process of FIG. 1 via a voice-over-IP gateway, according to an example embodiment.

Transacting 104 communication traffic may also include transmitting 124 the communication traffic from the sending participant to a receiving participant via a selected network path. For example, and referring also to FIG. 10, communication traffic may be received from client electronic device 32 encoded using codec 3. Further, path selector 156 of gateway 150 may transmit the communication traffic from client electronic device 32 to client electronic device 30 via network path 2. Accordingly, quality of experience process 10 may transact 104 communication traffic using codec 3 and network path 3, which may be determined to provide acceptable and/or the highest perceived quality of experience for the participants in the communication session.

Over the course of the communication session the network characteristics associated with one or more of the available network paths may change, e.g., due to changes in network congestion and/or other changes that may impact the performance characteristics of one or more of the network paths. The changes in the network characteristics may, accordingly, impact the relative performance of the available codecs. As such, the selected codec-network path combination may not provide an acceptable perceived quality of experience and/or may not provide an optimum perceived quality of experience for the communication session.

For example, the performance of the selected codec-network path combination may deteriorate such that the perceived quality of experience for the participants may be diminished. Additionally/alternatively, the changes in network conditions may make it such that a different codec-network path combination may be capable of providing a communication session having a higher perceived quality of experience. According to an embodiment, quality of experience process 10 may adaptively vary the codec-network path combination utilized for transacting the communication session, e.g., to provide an acceptable perceived quality of experience and/or to provide the highest possible perceived quality of experience. As such, quality of experience process 10 may vary both the codec and the network path utilized to transact the communication traffic throughout the duration of the communication session. The adaptive switching of the codec and/or the network path (e.g., the codec-network path combination) may occur continuously and or intermittently (e.g., at regular intervals and/or in response to changes in network conditions, or based upon one or more other factors).

Quality of experience process 10 may also dynamically determine 126 a changed codec-network path combination based upon, at least in part, a determined change in quality of experience associated with one or more of the plurality of codecs and the plurality of network paths. In a similar manner as discussed above, determining 126 the changed codec-network path combination may be based upon, at least in part, transmitted emulated communication traffic having traffic/packet patterns simulating the various different available codecs. Performance characteristics associated with the emulated communication traffic may be received and analyzed to determine quality of experience metrics for each codec across each network path based upon, at least in part, the changed network conditions associated with one or more of the network paths. A new codec-network path combination may be selected that may provide an acceptable perceived quality of experience, an improved perceived quality of experience, and/or an optimum perceived quality of experience.

Figure 11:
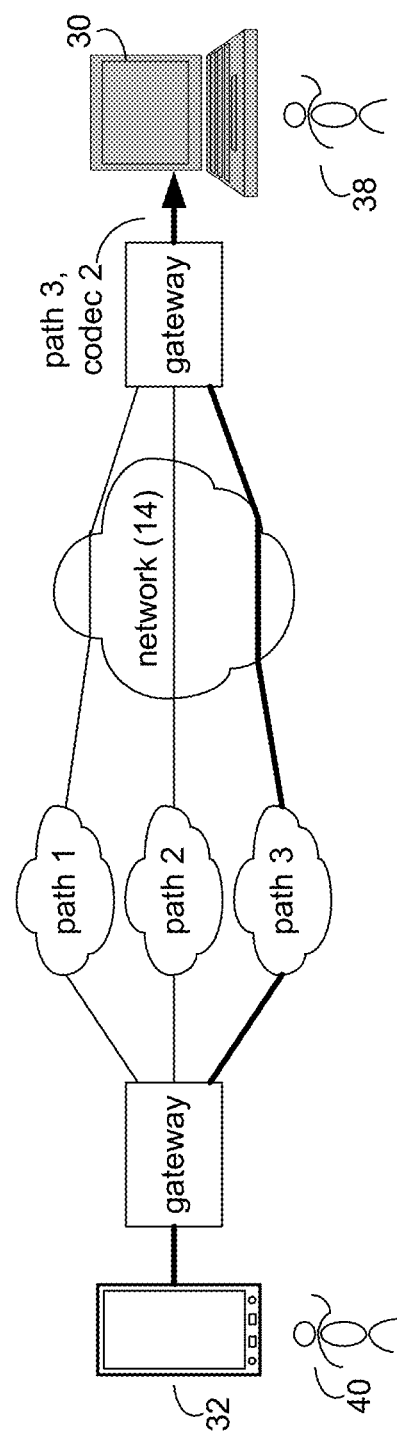
FIG. 11 diagrammatically depicts an implementation of the quality of experience process of FIG. 1 via a voice-over-IP gateway, according to an example embodiment.

For example, and referring also to FIG. 11, based upon, at least in part, changes in network conditions across one or more of the available network, a higher perceived quality of experience may be achieved using the codec 2-network path 3 combination as a changed codec-network path combination. Accordingly, quality of experience process 10 may transact 128 communication traffic using the changed codec-network path combination (e.g., codec 2-network path 3 combination). As such, quality of experience process 10 may adaptively switch both the codec and the network path together to achieved a new codec-network path combination for transacting the communication session. As generally discussed above, quality of experience process 10 may continuously and/or intermittently monitor and/or evaluate network characteristics and/or determine performance metrics.

Figure 12:
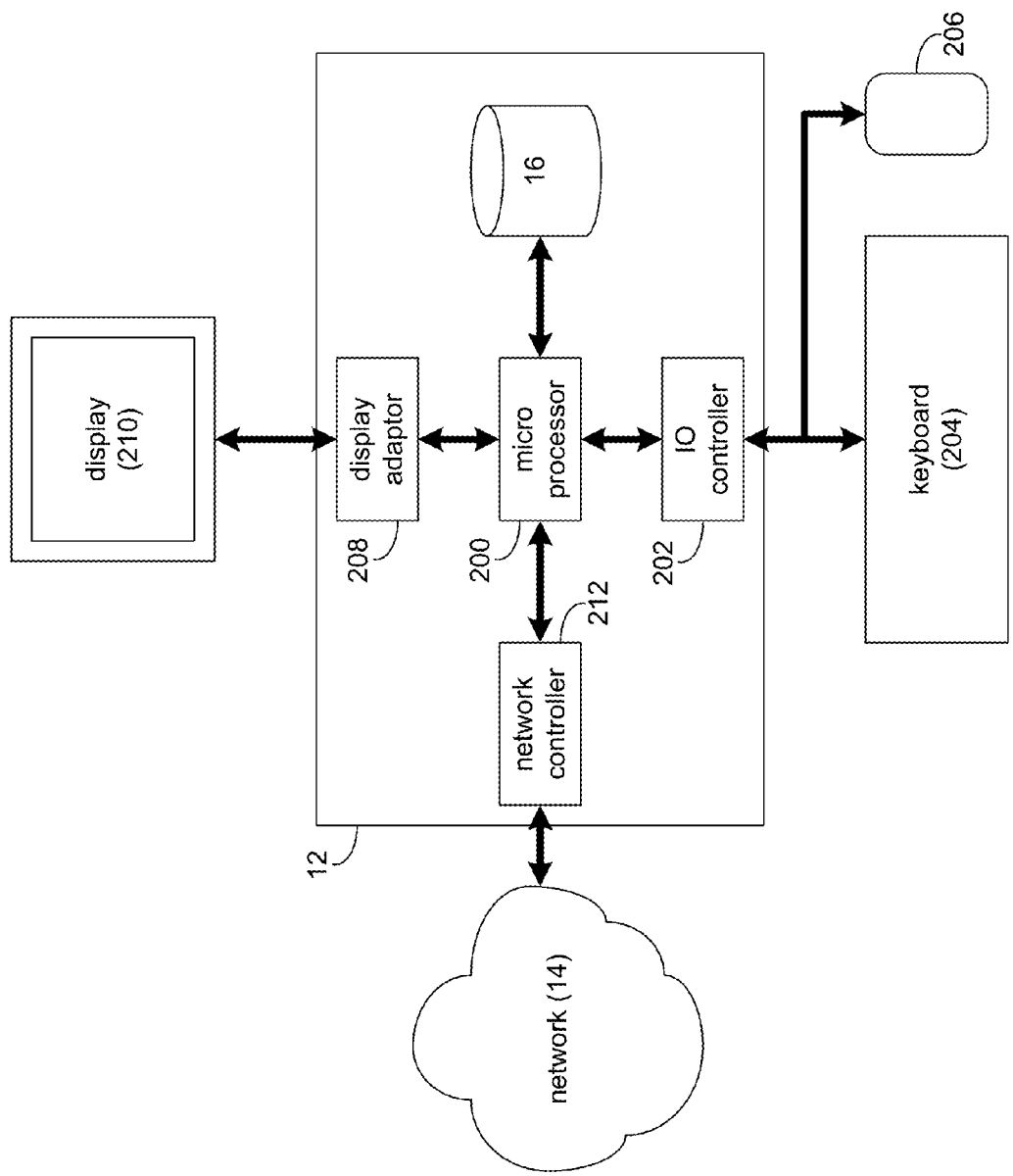
FIG. 12 is a diagrammatic view of the computing device of FIG. 1, according to an implementation of the present disclosure.

Referring also to FIG. 12, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, quality of experience process 10 may be substituted for computing device 12 within FIG. 12, examples of which may include but are not limited to client electronic devices 28, 30, 32, 34.

Computing system 12 may include microprocessor 200 configured to e.g., process data and execute instructions/code for screen capture process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer program product comprising a computer readable storage medium having a plurality of instructions stored thereon, which, when executed by a processor, cause the processor to perform operations including:
   analyzing network conditions relative to a plurality of codecs and a plurality of network paths;
   determining a quality of experience associated with each of the plurality of codecs across each of the plurality of network paths;
   transacting communication traffic using a codec-network path combination having a quality of experience above a predetermined threshold;
   dynamically determining a changed codec-network path combination based upon, at least in part, a determined change in quality of experience associated with one or more of the plurality of codecs and the plurality of network paths; and
   transacting communication traffic using the changed codec-network path combination.

2. The computer program product of claim 1, wherein the instructions for analyzing network conditions include instructions for:
   transmitting emulated communication traffic for each of the plurality of codecs across each of the plurality of network paths; and
   receiving performance characteristics associated with each of the plurality of codecs for each of the plurality of network paths.

3. The computer program product of claim 2, wherein the instructions for determining the quality of experience include instructions for:
   analyzing performance characteristics associated with each of the plurality of codecs across each of the plurality of network paths; and
   determining a quality of experience score for each of the plurality of codecs across each of the plurality of network paths.

4. The computer program product of claim 1, wherein the instructions for determining the quality of experience include instructions for:
   identifying one of the plurality of codecs associated with a quality of experience score above a threshold as a selected codec;
   identifying one of the plurality of network paths associated with a quality of experience score above the threshold as a selected network path; and
   determining a codec-network path combination having a quality of experience above a predetermined threshold based upon, at least in part, the selected codec and the selected network path.

5. The computer program product of claim 1, wherein the instructions for transacting communication traffic include instructions for:
   transmitting an indication of a selected codec to be utilized for transmitted communication traffic to a sending participant of a communication session; and
   receiving communication traffic from the sending participant, the communication traffic encoded according to the selected codec.

6. The computer program product of claim 5, further including instructions for:
   transmitting the communication traffic from the sending participant to a receiving participant via a selected network path.

7. A computing system comprising:
   a processor and a memory module coupled with the processor, the processor being configured for:
   analyzing network conditions relative to a plurality of codecs and a plurality of network paths;
   determining a quality of experience associated with each of the plurality of codecs across each of the plurality of network paths;
   transacting communication traffic using a codec-network path combination having a quality of experience above a predetermined threshold;
   dynamically determining a changed codec-network path combination based upon, at least in part, a determined change in quality of experience associated with one or more of the plurality of codecs and the plurality of network paths; and
   transacting communication traffic using the changed codec-network path combination.

8. The computing system of claim 7, wherein analyzing network conditions includes:
   transmitting emulated communication traffic for each of the plurality of codecs across each of the plurality of network paths; and
   receiving performance characteristics associated with each of the plurality of codecs for each of the plurality of network paths.

9. The computing system of claim 8, wherein determining the quality of experience includes:
   analyzing performance characteristics associated with each of the plurality of codecs across each of the plurality of network paths; and
   determining a quality of experience score for each of the plurality of codecs across each of the plurality of network paths.

10. The computing system of claim 7, wherein determining the quality of experience includes:
   identifying one of the plurality of codecs associated with a quality of experience score above a threshold as a selected codec;
   identifying one of the plurality of network paths associated with a quality of experience score above the threshold as a selected network path; and determining a codec-network path combination having a quality of experience above a predetermined threshold based upon, at least in part, the selected codec and the selected network path.

11. The computing system of claim 7, wherein transacting communication traffic includes:
transmitting an indication of a selected codec to be utilized for transmitted communication traffic to a sending participant of a communication session;
receiving communication traffic from the sending participant, the communication traffic encoded according to the selected codec; and
transmitting the communication traffic from the sending participant to a receiving participant via a selected network path.

* * * * *